US008430741B2

(12) United States Patent
Agarwal et al.

(10) Patent No.: US 8,430,741 B2
(45) Date of Patent: Apr. 30, 2013

(54) PRESENTING WAGERING GAME CONTENT IN MULTIPLE WINDOWS

(75) Inventors: Vijay K. Agarwal, Hoffman Estates, IL (US); Dale R. Buchholz, Palatine, IL (US); Mary M. Burke, Somonauk, IL (US); Timothy F. Dinovo, Hanover Park, IL (US); Magesh Gangadharan, Des Plaines, IL (US); Jacek A. Grabiec, Chicago, IL (US); James S. Halprin, Chicago, IL (US); Mark C. Pace, Palatine, IL (US); Jacqueline F. Parra, Glen Ellyn, IL (US); David M. Pryor, Elmhurst, IL (US); Matthew J. Ward, Northbrook, IL (US)

(73) Assignee: WMS Gaming, Inc., Waukegan, IL (US)

( * ) Notice: Subject to any disclaimer, the term of this patent is extended or adjusted under 35 U.S.C. 154(b) by 96 days.

(21) Appl. No.: 12/918,160

(22) PCT Filed: Mar. 3, 2009

(86) PCT No.: PCT/US2009/035938
§ 371 (c)(1),
(2), (4) Date: Aug. 18, 2010

(87) PCT Pub. No.: WO2009/111514
PCT Pub. Date: Sep. 11, 2009

(65) Prior Publication Data

US 2011/0028203 A1 Feb. 3, 2011

Related U.S. Application Data

(60) Provisional application No. 61/033,678, filed on Mar. 4, 2008, provisional application No. 61/036,671, filed on Mar. 14, 2008, provisional application No. 61/046,912, filed on Apr. 22, 2008, provisional application No. 61/054,270, filed on May 19, 2008.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................. 463/20; 463/16; 463/40; 463/41; 463/42; 463/43; 715/805

(58) Field of Classification Search ........................ None
See application file for complete search history.

(56) References Cited

U.S. PATENT DOCUMENTS 4,856,787 A * 8/1989 Itkis .............................. 273/237
5,791,991 A * 8/1998 Small .............................. 463/41

(Continued)

FOREIGN PATENT DOCUMENTS

WO WO-2007146205 12/2007
WO WO-2009111514 9/2009
WO WO-2009111515 9/2009

OTHER PUBLICATIONS

"PCT Application No. PCT/US09/35938 International Preliminary Report on Patentability", Mar. 11, 2010 , 13 pages.

(Continued)

*Primary Examiner* — Paul A D'Agostino
(74) *Attorney, Agent, or Firm* — DeLizio Gilliam, PLLC

(57) ABSTRACT

Described herein are processes and devices that present wagering game content in multiple windows. One of the devices described is a wagering game system. The wagering game system can receive wagering game content and control information from more than one content provider. The wagering game system can present the content from the various content providers in one or more windows, such as by presenting content from one provider in a main window while presenting content from a second provider in one or more auxiliary windows. The wagering game system can also determine priority information for content displayed in the windows and control the appearance and actions of the windows, or content displayed within the windows, based on the priority information.

20 Claims, 7 Drawing Sheets

U.S. PATENT DOCUMENTS

| | | | | |
|---|---|---|---|---|
| 6,002,397 | A * | 12/1999 | Jaaskelainen, Jr. | 715/805 |
| 6,135,884 | A * | 10/2000 | Hedrick et al. | 463/20 |
| 6,383,078 | B1 * | 5/2002 | Yacenda | 463/41 |
| 6,409,603 | B1 * | 6/2002 | Nishino et al. | 463/43 |
| 6,860,810 | B2 | 3/2005 | Cannon et al. | |
| 7,445,551 | B1 * | 11/2008 | Okada et al. | 463/43 |
| 2002/0094871 | A1 | 7/2002 | Luciano et al. | |
| 2004/0110566 | A1 * | 6/2004 | Schneider | 463/43 |
| 2004/0204231 | A1 | 10/2004 | Martin et al. | |
| 2004/0219969 | A1 * | 11/2004 | Casey et al. | 463/20 |
| 2005/0137013 | A1 | 6/2005 | Parasadaian | |
| 2005/0143174 | A1 * | 6/2005 | Goldman et al. | 463/42 |
| 2005/0164795 | A1 * | 7/2005 | Whitten et al. | 463/44 |
| 2005/0209000 | A1 * | 9/2005 | Kusajima et al. | 463/41 |
| 2005/0233794 | A1 * | 10/2005 | Cannon et al. | 463/16 |
| 2005/0282614 | A1 * | 12/2005 | Gauselmann | 463/20 |
| 2006/0040741 | A1 | 2/2006 | Griswold et al. | |
| 2006/0073890 | A1 * | 4/2006 | McAllister et al. | 463/29 |
| 2006/0100021 | A1 * | 5/2006 | Yoshino et al. | 463/45 |
| 2006/0116208 | A1 * | 6/2006 | Chen et al. | 463/43 |
| 2006/0143268 | A1 * | 6/2006 | Chatani | 709/203 |
| 2006/0205492 | A1 * | 9/2006 | Linard et al. | 463/29 |
| 2006/0217173 | A1 * | 9/2006 | Walker et al. | 463/16 |
| 2006/0247026 | A1 * | 11/2006 | Walker et al. | 463/25 |
| 2006/0258351 | A1 * | 11/2006 | Fingerhut et al. | 455/435.1 |
| 2006/0277135 | A1 * | 12/2006 | Jain et al. | 705/37 |
| 2006/0287106 | A1 * | 12/2006 | Jensen | 463/42 |
| 2007/0004516 | A1 * | 1/2007 | Jordan et al. | 463/42 |
| 2007/0016559 | A1 * | 1/2007 | Kraft | 707/3 |
| 2007/0099692 | A1 * | 5/2007 | Hishinuma et al. | 463/20 |
| 2007/0117608 | A1 * | 5/2007 | Roper et al. | 463/16 |
| 2007/0128899 | A1 * | 6/2007 | Mayer | 439/152 |
| 2007/0146812 | A1 * | 6/2007 | Lawton | 358/452 |
| 2007/0167216 | A1 * | 7/2007 | Walker et al. | 463/18 |
| 2007/0207851 | A1 * | 9/2007 | Yoshizawa | 463/22 |
| 2007/0226051 | A1 * | 9/2007 | Addepalli et al. | 705/14 |
| 2007/0298877 | A1 * | 12/2007 | Rosenberg | 463/30 |
| 2008/0046942 | A1 * | 2/2008 | Merlin | 725/110 |
| 2008/0064490 | A1 * | 3/2008 | Ellis | 463/25 |
| 2008/0102947 | A1 * | 5/2008 | Hays et al. | 463/31 |
| 2008/0108426 | A1 * | 5/2008 | Nguyen et al. | 463/25 |
| 2008/0139306 | A1 * | 6/2008 | Lutnick et al. | 463/30 |
| 2008/0147497 | A1 * | 6/2008 | Tischer | 705/14 |
| 2008/0171602 | A1 * | 7/2008 | Patel et al. | 463/42 |
| 2009/0093309 | A9 * | 4/2009 | Patel et al. | 463/42 |
| 2009/0113303 | A1 * | 4/2009 | Goossen et al. | 715/719 |
| 2010/0093440 | A1 * | 4/2010 | Burke | 463/42 |
| 2011/0009188 | A1 | 1/2011 | Adiraju et al. | |
| 2011/0246601 | A1 * | 10/2011 | Murray et al. | 709/217 |
| 2011/0312409 | A1 * | 12/2011 | Vancura | 463/25 |

OTHER PUBLICATIONS

"PCT Application No. PCT/US09/35938 International Search Report", Apr. 24, 2009 , 8 pages.

"PCT Application No. PCT/US09/35939 International Preliminary Report on Patentability", Mar. 29, 2010 , 12 pages.

"PCT Application No. PCT/US09/35939 International Search Report", May 4, 2009 , 10 pages.

"U.S. Appl. No. 12/918,179 Office Action", Jun. 29, 2012 , 11 pages.

* cited by examiner

PRESENTING WAGERING GAME CONTENT IN MULTIPLE WINDOWS

RELATED APPLICATIONS

This application claims the priority benefit of U.S. Provisional Application Ser. No. 61/033,678 filed Mar. 4, 2008, U.S. Provisional Application Ser. No. 61/036,671 filed Mar. 14, 2008, U.S. Provisional Application Ser. No. 61/046,912 filed Apr. 22, 2008, and U.S. Provisional Application Ser. No. 61/054,270 filed May 19, 2008.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

TECHNICAL FIELD

Embodiments of the inventive subject matter relate generally to wagering game systems, and more particularly to devices and processes that present wagering game content in multiple windows.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

SUMMARY

In some embodiments, a method comprises receiving primary wagering game content and control information from a primary content source; receiving secondary wagering game content and control information from a secondary content source; presenting the primary wagering game content in a main window and the secondary wagering game content in one or more auxiliary windows of a wagering game machine; determining content priority information for the primary wagering game content and the secondary wagering game content; and controlling the appearance and actions of the main window and the one or more auxiliary windows based on the content priority information.

In some embodiments, the primary content source is a first wagering game manufacturer store and the secondary content source is a second wagering game manufacturer store.

In some embodiments, the controlling comprises processing the primary wagering game content and the secondary wagering game content simultaneously.

In some embodiments, the determining comprises detecting a first wagering game result for the primary wagering game content, detecting a second wagering game result for the secondary wagering game content, and determining the respective importance of the first wagering game result and the second wagering game result by comparing each result to a set of priority rules.

In some embodiments, the controlling further comprises: processing the first wagering game result and the second wagering game result in order of their respective importance.

In some embodiments, the controlling includes controlling any one or more of the position, the layering, the size, the movement, the reactions, the controls, the display, and the characteristics of the main window and the one or more auxiliary windows based on the content priority information.

In some embodiments, one or more machine-readable media having instructions stored thereon, which when executed by a set of one or more processors causes the set of one or more processors to perform operations comprises receiving a first control statement to process primary wagering game content in a first content window on a wagering game machine, wherein the primary content originates from a first wagering game provider; receiving a second control statement to process secondary wagering game content in a second content window on the same wagering game machine, wherein the secondary wagering game content originates from a second wagering game provider; determining a priority for the first control statement and the second control statement based on a set of priority rules; and processing the first control statement and the second control statement according to the priority.

In some embodiments, the first content provider provides wagering games from a first wagering game manufacturer and wherein the second content provider provides wagering games from a second wagering game manufacturer.

In some embodiments, the operation of determining a priority for the first control statement and the second control statement based on a set of priority rules comprises determining a portion of content to be displayed in any one or more of the first content window and the second content window and generating a third control statement to change the size of any one or more of the first content window and the second content window to present the portion of content.

In some embodiments, the operations further comprise: receiving a wagering game player request; determining the respective priority of the wagering game player request in relation to any one or more of the first control statement and the second control statement; and processing the wagering game player request according to its respective priority.

In some embodiments, the operation for processing the first control statement and the second control statement according to the priority comprises deactivating one or more wagering game player request controls while processing any one or more of the primary wagering game content and the secondary wagering game content.

In some embodiments, a system comprises a primary wagering game server configured to provide primary wagering game content and primary control instructions regarding primary wagering game content; a secondary wagering game server configured to provide secondary wagering game content and secondary control instructions regarding secondary wagering game content; and a wagering game machine configured to present the primary and secondary wagering game content, wherein the wagering game machine is configured to present the primary wagering game content and the secondary wagering game content in any one or more of a main window and one or more auxiliary windows.

In some embodiments, the primary wagering game server is configured to serve wagering games created by a first wagering game manufacturer and the second wagering game server is configured to serve wagering games created by a second wagering game manufacturer.

In some embodiments, any one or more of the main window and the one or more auxiliary windows includes one or more controls for a wagering game player to interact with both the primary wagering game content and the secondary wagering game content.

In some embodiments, the system further comprises a coordination unit configured to determine from the primary control instructions and the secondary control instructions respective priorities for the primary wagering game content and the secondary wagering game content; and control any one or more of the main window and the one or more auxiliary windows according to the respective priorities of the primary and secondary wagering game content.

In some embodiments, the main window is configured to present a primary wagering game and the one or more auxiliary windows comprise a first auxiliary window configured to present a second wagering game and a second auxiliary window configured to present a third wagering game, and wherein the coordination unit is configured to determine from the primary control instructions and the secondary control instructions that the second wagering game has a higher priority than both the primary wagering game and the third wagering game; and raise the first auxiliary window above both the second auxiliary window and the main window.

In some embodiments, the wagering game machine comprises any one or more of meters and controls to control wagering activity for both the primary wagering game content and the secondary wagering game content.

In some embodiments, an apparatus comprises a primary content controller configured to provide control information for primary wagering game content; a secondary content controller configured to provide control information for secondary wagering game content; a windows controller configured to control the presentation of the primary wagering game content and the secondary wagering game content on a plurality of content windows on a wagering game machine; and a coordination unit configured to coordinate the presentation of the primary wagering game content and the secondary wagering game content in the plurality of content windows.

In some embodiments, the windows controller is configured to control any one or more of the position, the layering, the size, the movement, the reactions, the controls, the display, and the characteristics of the plurality of content windows.

In some embodiments, the coordination unit is configured to reconcile conflicting priority control statements from any one or more of the primary content controller and the secondary content controller.

In some embodiments, windows controller is configured to present the secondary wagering game content with greater significance than the primary wagering game content when the secondary wagering game content is presenting a high priority event.

In some embodiments, an apparatus comprises means for receiving primary wagering game content and secondary wagering game content from a plurality of wagering game servers, means for presenting primary wagering game content on a main window of a wagering game machine, wherein the primary wagering game content includes one or more client-side application files from a first wagering game manufacturer; and means for presenting secondary wagering game content in one or more auxiliary windows of the wagering game machine, wherein the secondary wagering game content includes a server-side application file from a second wagering game manufacturer.

In some embodiments, any one or more of the primary and secondary wagering game content are advertisement animations, and wherein presenting the primary and secondary wagering game content comprises means for presenting the advertisement animations in the main window and the one or more auxiliary windows according to any one or more of a periodic display schedule and a cyclical display schedule.

In some embodiments, the one or more auxiliary windows contain means for presenting a plurality of tabs.

In some embodiments, the apparatus further comprises means for determining that the secondary wagering game content results in a high priority event; means for pausing processing of the primary wagering game content; means for presenting the secondary wagering game content with the high priority event in the one or more auxiliary windows so that the one or more auxiliary windows covers at least some portion of the main window; and means for resuming processing of the primary wagering game content.

BRIEF DESCRIPTION OF THE DRAWING(S)

Embodiments are illustrated in the Figures of the accompanying drawings in which.

DESCRIPTION OF ILLUSTRATIVE EMBODIMENTS

This description of the embodiments is divided into five sections. The first section provides an introduction to embodiments. The second section describes example operating environments while the third section describes example operations performed by some embodiments. The fourth section describes additional example operating environments, while the fifth section presents some general comments.

Introduction

This section provides an introduction to some embodiments.

Figure 1:
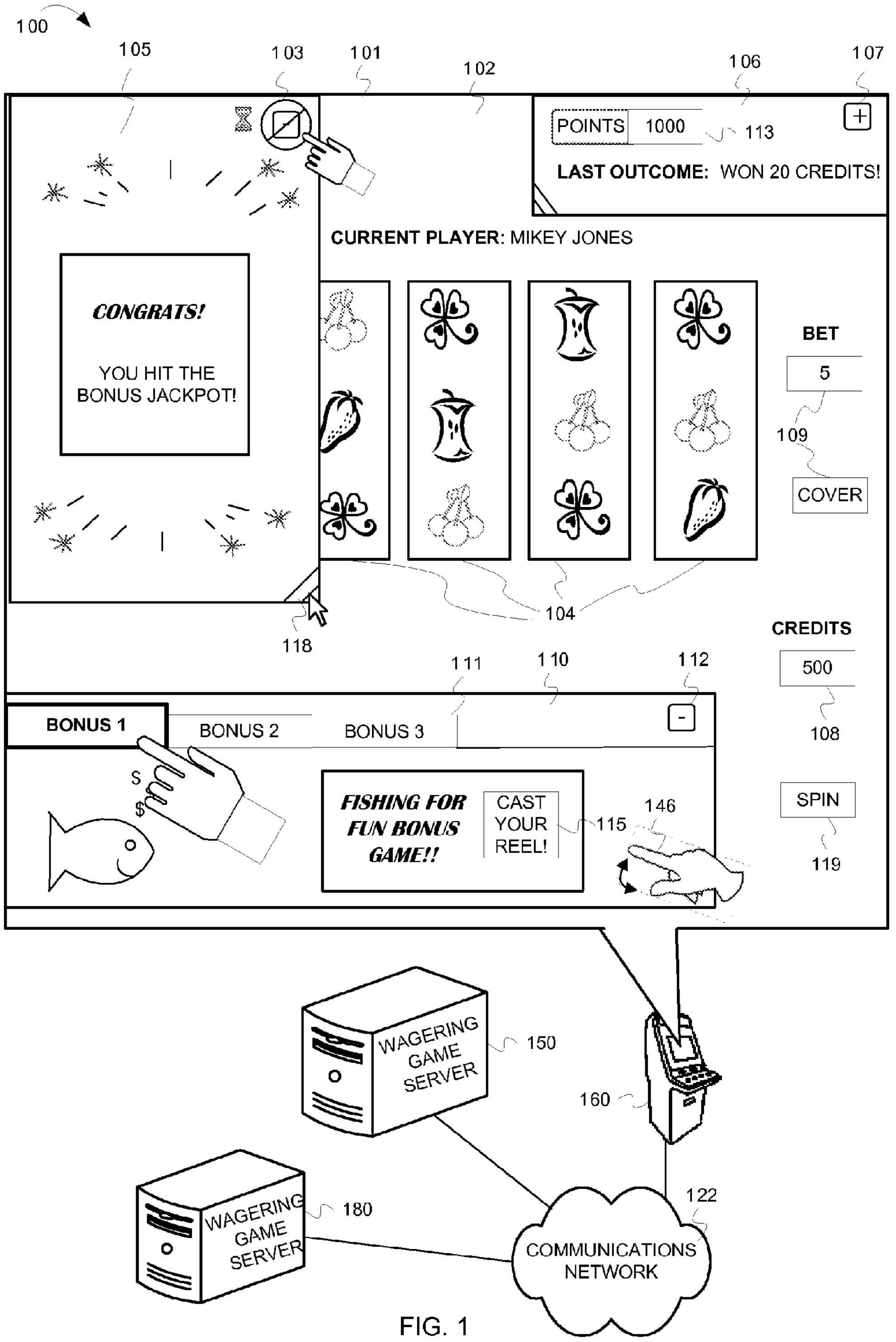
FIG. 1 is an illustration of presenting wagering game content in multiple windows on a wagering game machine, according to some embodiments.

Casinos, and other similar wagering game networks, provide a multitude of wagering games. These wagering games are created by different wagering game content providers and manufacturers, and are stored on separate gaming machines configured to process and present games from only that provider. When a player wants to play one of the games, the player has to find a specific machine within the casino that contains that wagering game. Some content providers, however, have recognized that a player may want to play more than one specific wagering game, and have thus created wagering game machines that can process and display multiple different wagering games themes and types from a single provider. Sometimes, however, a player may want to play a wagering game from more than one wagering game content provider or manufacturer. To do so, however, the player has to log in to, and out of, separate wagering game machines on a casino floor which are controlled by the different content providers. FIG. 1 shows a wagering game system 100 that can process multiple wagering games, from multiple content providers, on a single wagering game machine 160.

FIG. 1 is a conceptual diagram that illustrates an example of presenting wagering game content in multiple windows on a wagering game machine, according to some embodiments. In FIG. 1, a wagering game system ("system") 100 obtains wagering game content and control information, via a communications network 122, from multiple content sources (e.g., different servers 150 and 180, different content providers, different manufacturers, etc.). The system 100 can present the content from the multiple content sources in single display 101 on a wagering game machine 160. The system 100 can utilize multiple windows to display the content, such as a main window 102 to display content (e.g., slot reels 104) from a first content source as well as controls and meters 109 that relate to the content provided in the main window 102. The system 100 can utilize one or more "auxiliary windows", or "side-windows" 105, 106, 110, to present content from a second content source, along with some controls (e.g., button 115) and/or meters that may relate to the content in the side-bar windows 105, 106, 110. Further, the system can present some meters (e.g., the credit meter 108 and the point meter 113) and/or controls (e.g., the spin button 119), that may relate to activities that occur in all of the windows. Because the content in the main window 102 can come from a first content source, the content in the main window 102 may be referred to herein as "first-source" or "primary", content. The first content source may be referred to herein as a "primary" content source, or "primary" provider. Further, because the content in the side-windows 105, 106, 110 can come from a second content source, the content in the side-windows 105, 105, 110, may be referred to herein as "second-source" or "secondary", content. The second content source may be referred to as a "secondary" content source or a "secondary" provider. The terms "primary" and "secondary" distinguish the differences in the origin of the content, but not necessarily the importance or priority of the content.

The system 100 can determine how windows appear, expand, collapse, react to input, etc. The system 100 can intelligently determine an amount of available content to be displayed in a window, then automatically size, or resize, that window to present the amount of content. The system 100 determines the priority of primary content and secondary content in relation to each other. For example, the content of most importance, (e.g., a win notification) can get the highest priority and can be displayed first-in-time, or with greater significance (e.g., the system 100 may determine that a high priority window resizes and covers other lower priority windows, partially or fully, etc.). The side-windows 105, 106, 110 can have controls (e.g., collapse/minimize buttons, expand/maximize buttons, close/exit buttons, handles, scroll bars, resize-able frames, zoom, etc.) that a user can use to resize, move, or otherwise react with a window. For example, the side-windows 105, 106, 110 can have handles 118 to move the windows around. The frames of the side-windows 105, 106, 110 can be sizable. Further, the side-windows 105, 106, 110 can have control buttons 103, 107, 112 that collapse and expand the side-windows 105, 106, 110, respectively. The system 100 can prioritize a user's request to manipulate windows and respond to the request according to the importance and priority of the request. The system 100 can also deactivate certain functions based on priority and timing. For instance, the system 100 can prevent a window from being collapsed while a high priority activity occurs. For example, side-window 105 is displaying a celebratory animation of a jackpot win. As a result, the control button 103 is deactivated for the duration of the celebratory display so that a user cannot collapse the screen while the celebratory animation plays.

In some embodiments, the main window 102 and the side-windows 105, 106, 110, can present information using different technologies, file formats, etc. For instance, the wagering game machine 160 can present the primary content in the main window 102 using various complex game assets and configuration files stored on, or delivered to, the wagering game machine 160 when the wagering game machine 160 was configured by a first content provider (e.g. a manufacturer for the wagering game machine 160). The wagering game machine 160 can store and utilize the data, logic, game assets, etc., to present the primary content in a complex way (e.g., high-resolution, textured graphics, three-dimensional objects, etc.) and/or that may provide complex functionality that heavily utilizes the resources on the wagering game machine 160. Thus, the wagering game machine 160 can provide greater functionality in conjunction with the main window 102 and the primary content. However, the secondary content may come from a second content provider (e.g. a second manufacturer) that may not have access to all of the resources on the wagering game machine 160, or the wagering game network, that the primary content has access to. Consequently, the second manufacturer may create and/or provide (e.g., push the content from the wagering game server 180) the secondary content using technologies that can optimizes less complex data and programming, that can generate easily transportable files, that can quickly and efficiently push and pull data over a network, and that can unitize the secondary content into one, or very few, files. Examples of such technologies include, but are not limited to, Adobe ™ Flash ™ applications, Java Applets, streaming video and audio, Asynchronous Flash Applications, dynamic web technologies (e.g., XML, AJAX), etc. By utilizing these types of technologies, the second content provider can also better protect the secondary content by allowing the second content provider to store the secondary content on its own servers and push the secondary content to the side-windows. Thus, the secondary content provider may avoid having to store game assets on the wagering game machine 160, or other network servers, which may belong to, or be accessed by, competitors. Thus, in some embodiments, the side-windows 110 are configured to process different types of game content, in different files formats or using different technologies, than the main window 102.

Side-window 110 is an example of a side-window with tabbed sub-windows ("tabs") 111. Tabs 111 help to break up different types of content. The tabs 111 can show different game types, themes, denominations, etc. The tabs 111 can show content from one secondary content provider, or from multiple secondary content providers. In some embodiments, the side-window 110, and/or tabs 111, can display an "attract" (e.g., advertisement or other attractive animations). The system 100 can cycle through the windows and/or tabs to display the attracts. The wagering game machine 160 can have touch sensitive capabilities so that a user can select the different tabs 111, manipulate the control buttons, etc.

According to some embodiments, the wagering game system 100 can include numerous capabilities and configurations. The following non-exhaustive list enumerates some example capabilities and configurations:

- The system 100 can make the side-windows 105, 106, 110 viewable, and display secondary game animations in the side-windows 105, 106, 110, while the primary game is being played.
- The system 100 can make only one window "active" at a time. Audio and video content of the active window can take precedence over other window's content. The system 100 can also present a single "active" tab at a time. Other tabs and windows may process data in the background, however, even when they aren't active.
- The system 100 can utilize the tabs 111 to present different types of content, such as control content, game content, game information, etc., related to a single game, or to different games. For example, two tabs could show content for two different games, whereas a third tab could provide audio controls to determine which audio is played for which game, how loud, etc.
- The system 100 can prioritize the display of the game content within windows. For example, if two games are won at the same time, then the system 100 can first present a celebratory display of the game with the higher win value, and then present the other celebratory display.
- The system 100 can support patron input through a touch screen, a mouse-pointer, a text-box, a dynamic image and/or buttons, etc. The type of patron interaction can be determined by the content being displayed.
- The system 100 can automatically deactivate (e.g., resize, close, collapse, etc.) a window after a specified period of time. For example, if the window does not receive a user response within the specified period of time, the window can time out, and deactivate. In some examples, the system 100 can detect a set duration for content to display and then deactivate the window after the set duration. For instance, the system 100 can time the duration of a celebratory display and automatically close, or collapse, a window after a set amount of time.
- The system 100 can display windows from different locations on the display (e.g., top, sides, and bottom). The system 100 can cause a window to open, close, resize, etc. in different directions (e.g., up, down, left, right, diagonal).
- The system 100 can present side-windows on a top-box device, on a peripheral device, etc.
- The side-windows 105, 106, 110 can have the same functionality as each other, with controls, tabs, etc. In other embodiments, however, some windows may be different than others.
- The system 100 can create content that is displayed in a window and can control how that content operates. For instance, the system 100 can create custom jackpot celebrations and other custom animations for a specific window, based on a specific game theme, player, etc.
- The system 100 can determine any windows that are showing information that should remain in view and adjust the windows position, size, or the content within the windows, if necessary, so that the important content remains constantly viewable. For example, if a user presses a "help" button inside of a side-widow, the system 100 can resize the side-window to display help text and graphics. The system 100 can scale the frame size of a window, to show more or less content. In other words, when a window is made smaller, fewer words, images, etc. might be shown. On the other hand, system 100 can scale the content in the window to grow, or shrink, as the window frame is resized.
- The system 100 can change the frame, borders, background, etc., of a window with different themes. The themes can be set by, and indicate, a content provider.
- The system 100 can respond to complex finger movements (e.g., finger strokes, pinches, reverse pinches, etc.) to emulate the same actions that the control elements perform. For example, the hand 146 illustrates a pinching movement that could zoom in and out of the side-window 110.
- The system 100 can manipulate (e.g., close, open, move, etc.) multiple windows at once, and also provide control elements that permit a user to do the same.
- The system 100 can summarize any critical information from multiple windows and/or tabs into a small portion of an active window. Thus, the system 100 can present mandatory information, as determined by a content provider, within a minimally intrusive, but continuously viewable window.
- The system 100 can minimize a side-window during a spin. The system 100, still present critical data on the minimized display of the side-window, for example, to report the results of the spin.
- The system 100 can detect when specific modes occur in different windows and accordingly control the content of other windows. For example, the system 100 can detect when a window activates an attract mode. The system 100 can cycle the attract sequence through some, or all, windows and/or tabs. For example, the system 100 can activate an attract mode on the main window 102, then activate an attract mode in the side-window 105, and so on through side-windows 106, 110, until returning back to the main window 102. This also works with the tabs 111. The system 100 can show attract animations as well as other casino controlled content while in attract mode. The system 100 can have a configuration controller that can be used to set the times to show the attract modes.
- The system 100 can also cause attract modes, and other modes (e.g., game modes, help modes, casino-service modes, etc.) to operate at the same time. For example, the main window 102 can operate in a game mode under, or behind, the side-window 105, while the side-window 105 operates in a celebratory mode.
- The system 100 can support user input, if appropriate, for the content being displayed. For examples, the system 100 can detect when a patron interacts with casino services or account entry information.
- The system 100 can control whether a secondary content window overlays or scales a main content window.
- The system 100 can elevate a priority, or importance, of content being displayed within any of the windows. For example, the system 100 can force a window above other windows, present a message or warning in the window, cause enhanced window activity, etc., to bring the window to a patron's attention if there is information in the window that the user needs to be aware of
- The system 100 can intercommunicate between windows to communicate game and account information (e.g., wagers, spins, game outcomes, credits, etc.)
- The system 100 can determine restrictions on a window, such as when a window can be selected, when a window should be grayed out, when a window should be replaced with a non-selectable animation, etc.

The system 100 can determine denominations, user languages, etc. of game content from other providers, manufacturers, etc.

The system 100 can interact with servers from different providers to obtain control logic and content. The system 100 can include content on the same servers and treat the content differently according to different rules.

The system 100 can control game activity in all windows, interact with all games, etc.

The system 100 can run on a wagering game machine, on a server, or any combination.

The system 100 can delegate control capabilities to primary game content so that the primary game content can control one or more secondary content games.

Although FIG. 1 describes some embodiments, the following sections describe many other features and embodiments.

Example Operating Environments

This section describes example operating environments and networks and presents structural aspects of some embodiments. More specifically, this section includes discussion about wagering game system architectures.

Example Wagering Game System Architecture

Figure 2:
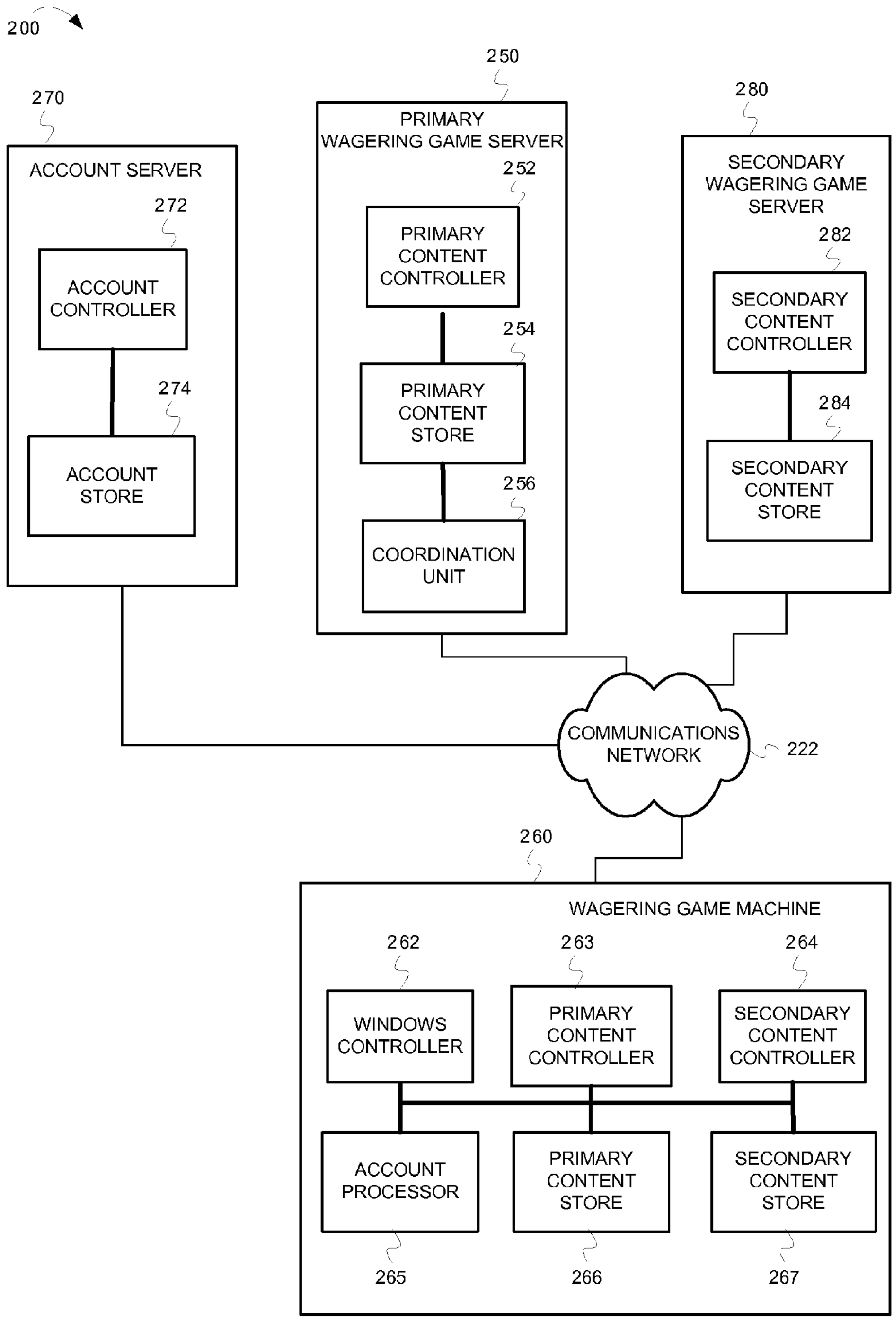
FIG. 2 is an illustration of a wagering game system architecture 200, according to some embodiments.

FIG. 2 is a conceptual diagram that illustrates an example of a wagering game system architecture 200, according to some embodiments. The wagering game system architecture 200 can include a primary wagering game server 250 configured to control primary wagering game content and communicate wagering game information, account information, and/or content coordination information to and from a wagering game machine 260. The primary wagering game server 250 can include a primary content controller 252 configured to manage and control primary content and presentation of primary content on the wagering game machine 260. The primary wagering game server 250 also can include a primary content store 254 configured to contain primary content to present on the wagering game machine 260. The primary wagering game server 250 also can include a coordination unit 256 configured to coordinate communications and control information between multiple content sources and account servers.

The wagering game system architecture 200 also can include a secondary wagering game server 280 configured to control secondary wagering game content and communicate wagering game information and/or account information to and from the wagering game machine 260. The secondary wagering game server 280 can include a secondary content controller 282 configured to manage and control secondary content and presentation of secondary content on the wagering game machine 260. The secondary wagering game server 280 also can include a secondary content store 284 configured to contain secondary content to present on the wagering game machine 260.

The wagering game system architecture 200 also can include an account server 270 configured to process financial transactions and control user related accounts accessible via wagering game networks and social networks. The account server 270 can store and track player information, such as identifying information (e.g., avatars, screen name, account identification numbers, etc.) or other information like financial account information, social contact information, etc. The account server 270 can contain accounts for social contacts referenced by the player account. The account server 270 can also provide auditing capabilities, according to regulatory rules, and track the performance of player's, machines, and servers. The account server 270 can include an account controller 272 configured to control information for a player's account. The account server 270 also can include an account store 274 configured to store information for a player's account.

The wagering game system architecture 200 also can include a wagering game machine 260 configured to present wagering game content, to receive and transmit information between various content sources and account servers, and to coordinate the presentation of the wagering game content in multiple windows within a graphical user interface on the wagering game machine 260. The wagering game machine 260 can include a windows controller 262 configured to coordinate the positioning, controls, actions, and timing of windows. The windows controller 262 can determine the priority of content and generate instructions that will control windows according to the priority of the content. The windows controller 262 also can communicate between windows, such as to determine wager amounts, account credit amounts, point amounts, etc. The windows controller 262 can also detect, and coordinate, the presentation of attract mode content. The wagering game machine 260 also can include a primary content controller 263 configured to manage and control primary content and presentation of primary content on the wagering game machine 260. For example, the primary content controller 263 controls how the primary content appears and acts within a main window. The wagering game machine 260 also can include a primary content store 266 configured to store primary content. The wagering game machine 260 also can include a secondary content controller 264 configured to manage and control secondary content and presentation of secondary content on the wagering game machine 260. For example, the secondary content controller 264 controls how the secondary content appears and acts within a side-window. The wagering game machine 260 also can include a secondary content store 267 configured to store secondary content. The wagering game machine 260 also can include an account processor 265 configured to control and communicate account information (e.g., financial transactions, player tracking information, etc.).

Each component shown in the wagering game system architecture 200 is shown as a separate and distinct element. However, some functions performed by one component could be performed by other components. For example, the coordination unit 256 can control windows and/or presentation of content, as necessary, to ensure a proper coordination of data. The coordination unit 256 may be in a separate device, or in one of the other devices shown. Furthermore, the components shown may all be contained in one device, but some, or all, may be included in, or performed by multiple devices on the systems and networks 222, as in the configurations shown in FIG. 2 or other configurations not shown. For example, in some embodiments, all content may be served from one machine or device, within a casino network, and/or be stored on the same storage device. The content can be stored on the one device with metadata that describes the provider for the content. The one device can have separate content controllers to exclusively control content from a single provider. The system can access the content, read the metadata, and determine from which provider the content originates so that it knows how to create control data (e.g., information/instructions that control the movement and action of a window, on the wagering game machine, in relation to the window's content.)

Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network. Furthermore, any of the components can be integrated or divided.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 3:
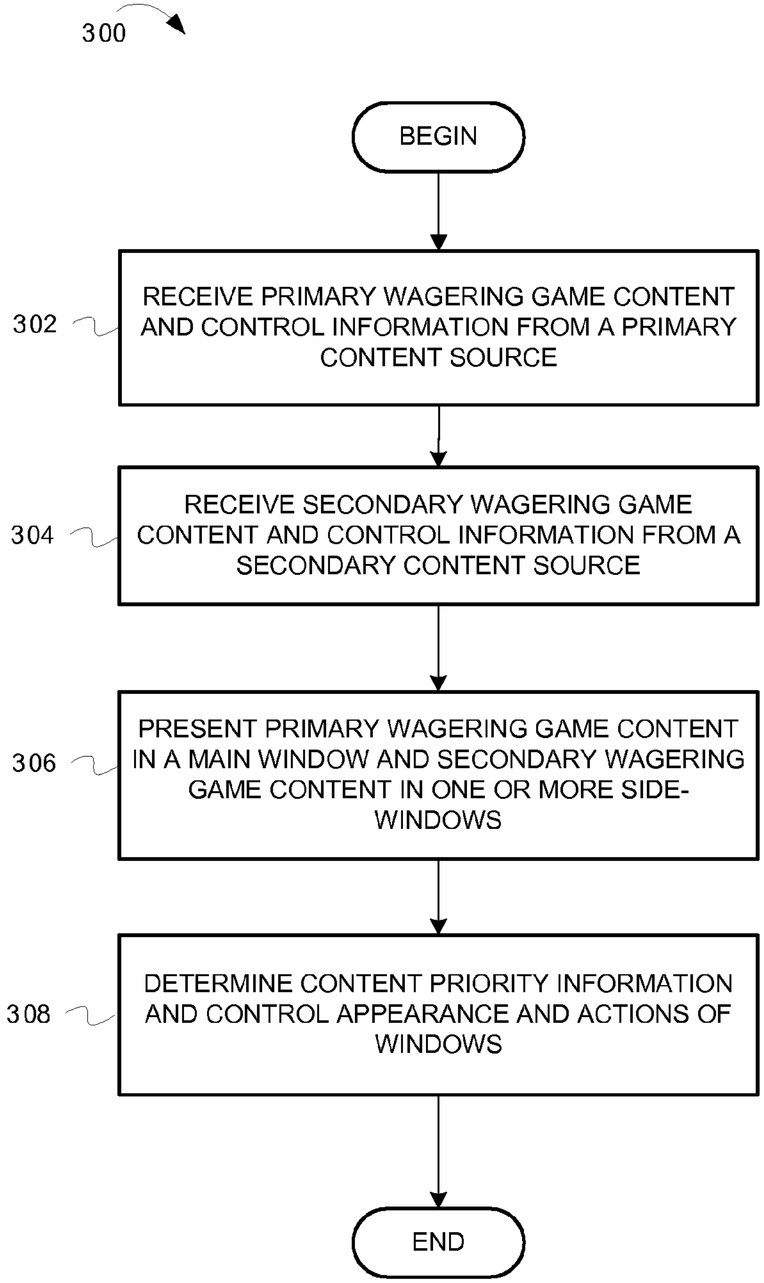
FIG. 3 is a flow diagram 300 illustrating presenting wagering game content from multiple wagering game content sources, according to some embodiments.

FIG. 3 is a flow diagram illustrating operations for presenting wagering game content from multiple wagering game content sources, according to some embodiments. In FIG. 3, the flow 300 begins at processing block 302, where a wagering game system ("system") receives primary wagering game content and control information from a primary content source.

The flow 300 continues at processing block 304, where the system receives secondary wagering game content and control information from a secondary content source. The secondary content source can push the secondary content, such as an Adobe Flash application, to a wagering game machine.

The flow 300 continues at processing block 306, where the system presents primary wagering game content in a main window and secondary wagering game content in one or more side-windows. The system can present the primary content and the secondary content simultaneously in their respective windows. The system can also control and present the primary and secondary content within their respective windows so that the content is mutually exclusive of each-other, or in other words, so that the content in each window does not have to affect the content in any other window.

The flow 300 continues at processing block 308, where the system determines content priority information and controls the appearance and actions of windows based on the content priority information. The system can detect activity occurring in each window, and can determine the importance of that activity. Based on the importance of that activity, the system can determine which activity has the highest priority, and generate one or more priority commands to control how the window reacts to other windows or user requests. Based on the priority commands, the system can control the appearance and actions of the windows.

Figure 4:
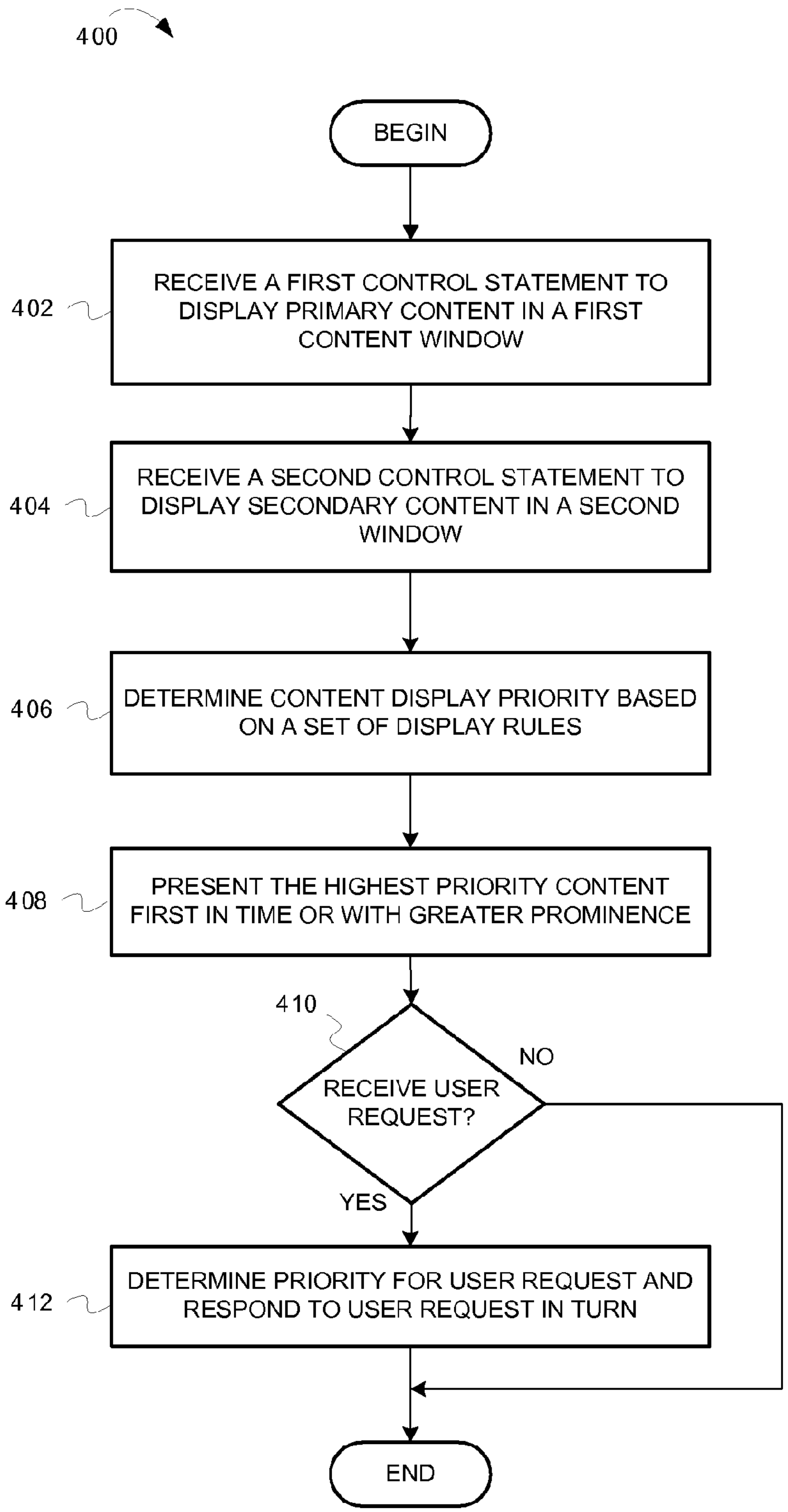
FIG. 4 is a flow diagram 400 illustrating coordinating the presentation of windows on a wagering game machine, according to some embodiments.

FIG. 4 is a flow diagram illustrating operations for coordinating the presentation of windows on a wagering game machine, according to some embodiments. In FIG. 4, the flow 400 begins at processing block 402, where a wagering game system ("system") receives a first control statement to display primary content in a first content window.

The flow 400 continues at processing block 404, where the system receives a second control statement to display secondary content in a second window. The first and second control statements can be generated by two different servers from two different content providers.

The flow 400 continues at processing block 406, where the system determines a content display priority for both the primary and secondary content based on a set of display rules. For instance, the system can store a set of rules based on the system's configuration settings, which control how content is displayed.

The flow 400 continues at processing block 408, where the system presents the highest priority content first in time or with greater prominence. For example, the system may detect a slot reel spin from a first game in a first window and a slot reel spin from a second game in a second window. The first game may complete its spin before the spin in the second window. If the first game in the first window results in a win, and the second game in the second screen does not, the system may determine, according to a hierarchy of rules, that a celebratory screen of a win is a high priority event, and must be displayed immediately, and with greater prominence, than a non-win presentation. As a result, the system may raise the first window above any other windows, run celebratory animations in the first widow, increase lighting and/or contrast in the first window, etc. On the other hand, if the second game in the second window also wins at the same time that the first game in the first window wins, the system may determine which win resulted in a greater amount. The system can determine that the win with the greater amount is more important and, consequently, has a higher priority. As a result, the system can display a celebratory screen for the game with the highest win amount and hold in stasis the second celebratory screen until the first one is complete. Priority rules can take into consideration multiple factors, including, but not limited to, wins/loss information, credit information, meter information, user account information, hardware resources, advertising schedules, environmental variables, etc. Different content providers can determine their own set of rules. A coordination unit, in a central server, however, may reconcile the rules between various providers, and provide control information to the wagering game machine to prevent conflicts. Further, the system can provide a consistent set of rules, or protocol, to which all content providers can adhere.

The flow 400 continues at processing block 410, where the system receives a user request to manipulate a window or to interact with content displayed within a window. If the system receives a user request, then the flow continues at block 412.

The flow 400 continues at processing block 412, where the system determines a priority for the user request and responds to the user request according its priority. For example, a user may request to close a window. The system, however, has to determine whether the activity that is occurring within the window is more important that the user's request. For instance, the window may be presenting a reel spin, or another similar type of active game activity. As a result the system may determine that the reel spin must occur, and be presented, before the window can be closed. Alternatively, the system can plan for priority activities, such as by deactivating certain control options before processing a high priority command.

For example, before conducting a wheel spin, the system can deactivate the control button that closes a window.

Additional Example Operating Environments

This section describes example operating environments, systems and networks, and presents structural aspects of some embodiments.

Figure 5:
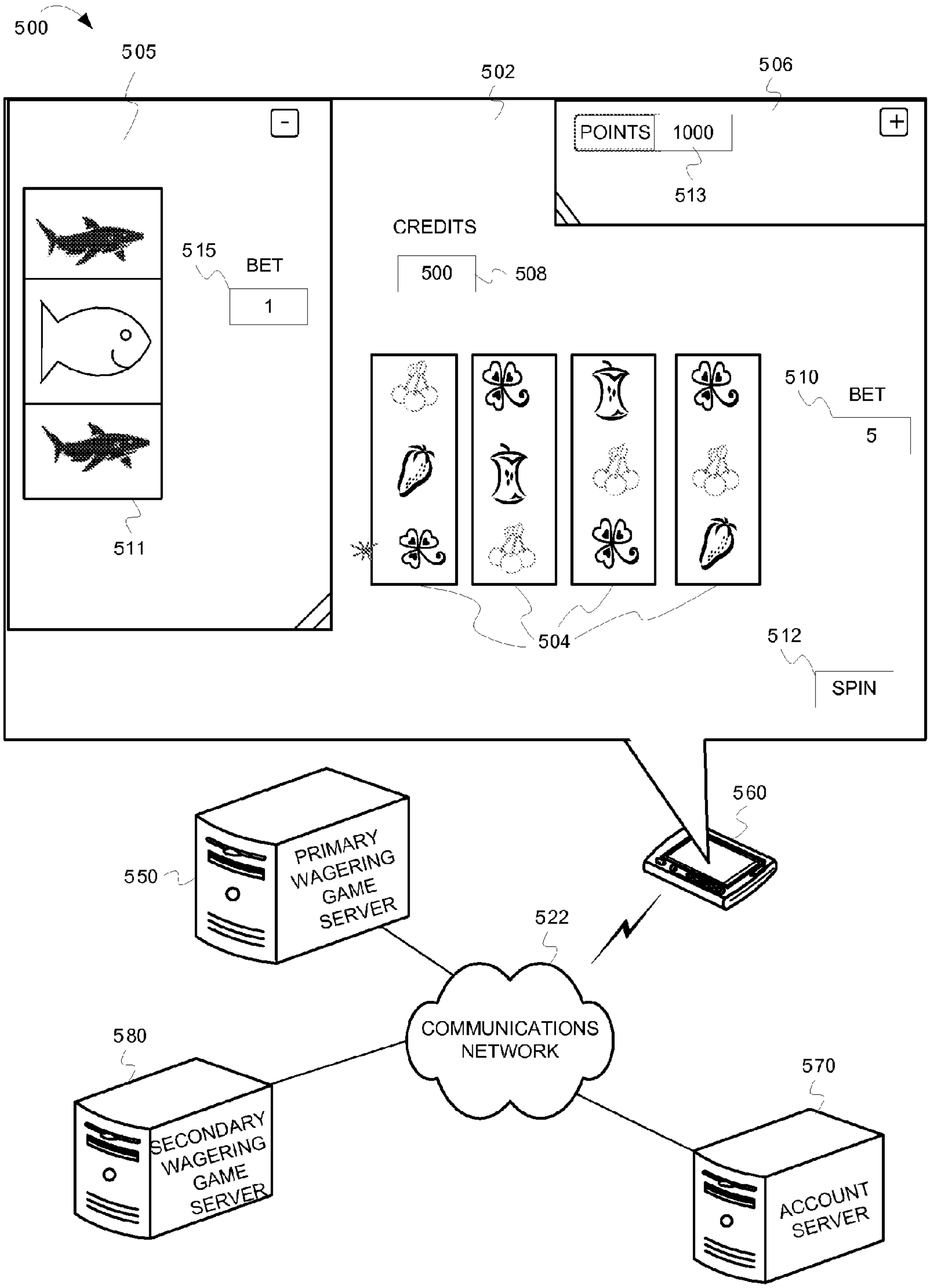
FIG. 5 is an illustration of coordinating account information between multiple content sources, according to some embodiments.

Coordinating Account Information in a Multiple-Content-Source Wagering Game Session FIG. 5 is a conceptual diagram that illustrates an example of coordinating account information between multiple content sources, according to some embodiments. In FIG. 5, an account-based wagering system ("system") 500 maintains a player wagering account on at least one account server 570. In some embodiments, more than one account server (e.g., a primary account server and secondary account server) can track more than one account, or more than one account can be tracked on a single account server 570. However, the account server 570, the wagering game machine 560, or some other device(s), can reconcile any transactions and balances for the multiple accounts so that the wagering game machine 560 can present a single credit meter 508 showing a combined total for all accounts.

The account server 570 can contain account information, and can communicate the account information via the communication network 522. The account server 570 can communicate with the wagering game machine 560 when the wagering game machine 560 is within range of the casino network. The account server 570 can manage a player's funds; provide auditing capabilities meeting exiting regulations; track player, machine, or portal performance in real time; and perform other operations related to tracking wagering game and player information. A player can add funds to the account at a cage, a kiosk, a computer, or at the wagering game machine 560, using a variety of funding methods (e.g., deposited cash, redeemed tickets, electronic funds transfers, bonus awards, funds awarded from third-party servers, etc.) The player can allocate some or all of their funds in an account to a game play session. A game play session can be started when a player inserts a player card into the wagering game machine 560 and can end when the player cashes out and removes the player card from the wagering game machine 560. The tracking of wagering game funds using an account may be referred to herein as an "account-based" funds-tracking mode, or more succinctly, as an "account-based mode".

The system 500 can obtain content from multiple content sources, such as a primary wagering game server ("primary server") 550 and a secondary wagering game server ("secondary server") 580. In some embodiments, the wagering game machine 560 may track funds in a first funds-tracking mode (e.g., a cash-based mode or ticket-based mode) for a primary game, but receive a request to play a secondary game that utilizes a different funds-tracking mode (e.g., an account-based mode). For instance, a player may be playing a primary wagering game hosted by the primary server 550. The primary game may be tracking game credits using a cash-based mode, such as a ticket-in-ticket-out (TITO) mode. But, the player may wish to play a secondary game that utilizes an account-based mode to track funds. As a result, the system 500 may prefer to utilize a single funds-tracking mode for both primary and secondary games (e.g., a single account-based mode.) A single funds-tracking mode, such as an account-based mode, can make credit tracking easier, especially when both games share the same credit meter 508.

Therefore, the system 500 can transition the game session from playing in the first funds-tracking mode (e.g., the cash-based mode), for the primary game, to the second funds-tracking mode (e.g., the account based mode), for both the primary and secondary games. Specifically, when the system detects a request for an account-based secondary game, the system 500 can transfer the funds on the wagering game machine 560 to an account on the account server 570 (although in some embodiments, system 500 may instead cash-out the funds on the wagering game machine 560 for the primary game before transitioning into an account-based mode.) The system 500 can then begin processing the primary and secondary wagering games in the account-based mode, using the account on the account server 570 to track game wagers and credits.

During the game play session, content is displayed in multiple windows. For example, primary content (for a first, or "primary" wagering game), can be displayed in the main window 502. Secondary content (for a second, or "secondary" wagering game), can be displayed in the side-window 505. Side-window 506 can track other critical data and meters, like a point meter 513 that tracks points which can be redeemed for rewards on a social, or community, network. The system 500 tracks the account balances between the different games and reconciles the account balance displayed in the credit meter 508 with the account server 570. The system 500 uses the credit meter 508 at the wagering game machine 560 to display the current balance of the funds allocated to the session. The credit meter 508 at the wagering game machine 560 and the session balance at the account server 570 are synchronized as game play proceeds during the session. The system 500 can ensure that the account balance displayed on the credit meter 508 is the same as the account balance tracked by the account server 570, at least, at session start and session end. During game play, however, the system 500 can tightly or loosely synchronize the session balance at the wagering game machine 560 and the account server 570. Network latency and end point processing delays may result in instances of time where the wagering game machine 560 view of the session balance and the account balance on the account server 570 are not identical.

The system 500 can provide various modes for synchronizing (i.e., reconciling) the credit meter 508 and the account server 570 during the game play session. The following non-exhaustive list enumerates some possible synchronization modes.

Strict Synchronization Mode. In this mode, the system 500 can synchronize the account balance every time the system 500 detects a wager and after the system 500 generates an outcome for that wager. More specifically, the wagering game machine 560 can report a wager and await an acknowledgment message ("acknowledgement") from the system 500 that the wager was received. The acknowledgment includes the new value to be displayed at the credit meter 508. The system 500 can prevent the game from starting until the system 500 has validated the amount wagered, deducted the wager from the session balance, and sent a new balance to be displayed. Upon receipt of the acknowledgment, the wagering game machine 560 may start the game. If the system 500 cannot validate the wager, however, then the wagering game machine 560 may tilt the game. The wagering game machine 560 bets the wager and determines a game result from that wager. For example, the wagering game machine 560 communicates with the primary or secondary servers 550, 580, to obtain a random-number that indicates a game outcome. If the game result is a “win”, then the primary or secondary servers 550, 580 (or the wagering game machine 560) can generate a win amount. The wagering game machine 560 reports the win amount to the account server 570. The account server 570 adds any winnings to the session balance and sends an acknowledgment that includes the new balance to be displayed on the credit meter 508. The wagering game machine 560 can be disabled until the acknowledgment is received. This can keep a player from making a new wager or starting a new game until the account balance is synchronized. Strict Synchronization mode can provide real-time security and synchronization by assuring that the credit meter 508 and the account balance on the account server 570 are consistently synchronized.

Game Ended Mode. This mode is a variation of the Strict Synchronization mode that reconciles the account balances only at the time of the game result, instead of at both the time of the wager and at the time of the game result. More specifically, the wagering game machine 560 reports the results of a wagering game including the total wager and final winnings The system 500 subtracts the total wager and adds the winnings to the session balance thereby creating a new balance. The acknowledgment provides a new value for the wagering game machine 560 to display in the credit meter 508. The acknowledgement can also provide authorization that allows the wagering game machine 560 to activate a new game, spin a reel, etc. Thus, in Game Ended mode, the system 500 allows the wagering game machine 560 to initiate game play without needing to explicitly authorize all wagers as they are placed. However, the wagering game machine 560 is prevented from initiating any subsequent game play until a current game play's wagers and winnings are reconciled with the account server 570. This mode can run more quickly than the Strict Synchronization mode because it eliminates the need to generate wager authorization messages and acknowledgements, while still maintaining synchronization at the per-game level.

Loose Mode. In this mode, the wagering game machine 560 and system 500 do not operate in lock-step as in Strict Synchronization or Game Ended modes. The system 500 allows the wagering game machine 560 to play games as quickly as possible. The wagering game machine 560 sends game results for each game, but due to network transmission latency and/or host processing delays, a new game may have been started before the system 500 can update the account balance at the account server 570. At the discretion of the system 500, the system 500 can periodically lock the wagering game machine 560 and reconcile the account balance. For example, the system 500 can lock the wagering game machine 560 after 10 games have been played, update the session balance, and then unlock the wagering game machine 560 for further game play. If the system 500 determines that there is a discrepancy between the credit meter 508 at the wagering game machine 560 and the session balance at the account server 570, then the system 500 can lock the wagering game machine 560 until the discrepancy is resolved. In some embodiments, the frequency of reconciling the wagering game machine 560 and account server 570 can be set by an operator or regulator. In addition, the system 500 can provide a manual reconciliation function so that the operator can request that the session account balance be synchronized on demand. Loose mode allows a wagering game machine to continuously play games without wager authorization and without reconciling the account balance on a per-game basis. The system 500 may lags a little in updating the wagering account server 570 with wagering information, but the system 500 can be configured to communicate with the account server 570 periodically enough that the account server 570 is not out-of-date for more than a few seconds. This mode represents a reasonable approach when game play is fast or when the casino is particularly busy.

The system 500 can be configured so that a casino operator and/or regulator can choose a mode that balances real-time player performance with operational or regulatory requirements. The system 500 can have a configuration setting that the operator or regulator can set to operate in a desired mode. Depending on the configuration setting, the wagering game machine 560 can operate differently, according to a different set of control rules. For example, one configuration setting may require the wagering game machine 560 to authorizes each wager, another configuration setting may require the wagering game machine 560 to start at most one spin without authorization, while yet another configuration setting may require the wagering game machine to continue to play games until the account server 570 requests reconciliation. For instance, one spin button (e.g., button 512) on the wagering game machine 560 may trigger a number of spins on primary and secondary games. Hence, the system 500 can be configured, according to one configuration setting (e.g., for Game Ended or Loose modes), with control rules that can allow the wagering game machine 560 to authorize more than one game wager simultaneously. The system 500 can run all wagering game machines on a network in one mode or it can support wagering game machines running in different modes. For example, some wagering game machines might be configured to run in Strict Synchronization mode while others run in Game Ended or Loose modes. This allows an operator to tailor the system 500. The system 500 can also be configured to change modes during a player game session. The system 500 can be configured to switch modes in a way that is transparent to the player.

The system 500 synchronizes account balances for all games played in a single wagering session, even when the content for the games is served by different content sources. The system 500 tracks wagers and balances from primary and secondary games. The system 500 can calculate combined credit totals between primary and secondary games and report the credit totals to the account server 570 as a single atomic transaction. As long as the player is still logged on to the system 500, the system 500 can add any win amounts to the current session balance and display those amounts in the credit meter 508. It is also possible, however, for some games to be long-running, which may end after the player has logged off the system 500 before that game's outcome is known. In those cases the winnings, the system can still apply any winnings directly to the player's account on the account server 570. The system 500 can notify the player, in some manner, about the win from the long-running game, such as via text message or email.

Some embodiments for tracking and synchronizing account balances for primary and secondary games include configuring the wagering game machine 560 to control the priority, appearance, and functionality of the game content in all windows. The wagering game machine 560 can hold games in stasis and prevent certain activities, when necessary, to reconcile wager and account balances and to update the credit meter 508.

The following non-exhaustive list enumerates some possible embodiments for synchronizing account balances for games provided by a plurality of content sources, using variations of the Strict Synchronization mode described further above:

- Strict Mode for Combined Primary and Secondary Game Totals. The wagering game machine 560 determines wagers being placed in the main window 502 and the side-window 505. For example, a primary game and a secondary game may be played at the same time. The example in FIG. 5 illustrates two games being played on the same wagering game machine 560. A primary game is played in the main window 508 with reels 504 that spin when the spin button 512 is activated. A wager, or bet, is either entered manually or displayed automatically in the bet meter 510. In the side-window 505, a secondary game is played, with a reel 511 that also spins when the spin button 512 is activated. The bet meter 515 tracks the wagers for the secondary game. Alternatively, there may be separate spin buttons for both the primary game and the secondary games. The wagering game machine 560 combines all wagers from both games into a single amount and communicates the wager amount to the account server 570. The wagering game machine 560 can hold the games in stasis until the account server 570 records the wagers amounts, deducts the wager amounts from the account balance, and sends an acknowledgement back to the wagering game machine 560 that the player's funds are sufficient to cover the wager, as well as an updated account balance. The wagering game machine updates the credit meter 508 with the updated account balance. The wagering game machine 560 then permits the primary and secondary games to execute after the wagers have been recorded. Once the spin button 512 has been activated, the wagering game machine 560 can communicate with any one of the primary server 550 and secondary server 580 to obtain game results. The primary and secondary servers 550, 580 can calculate random numbers, generate game results (e.g., win/loss results), and communicate the game results to the wagering game machine 560 for the primary and secondary games. When game play completes for both the primary and secondary games, or in other words, when a primary game and a secondary game have completed the spins and received game results from their respective servers, the wagering game machine 560 can halt play on the wagering game machine 560 and transmit the total win amount to the account server 570. The account server 570 updates the account balance and then communicates a credit balance to be displayed on the credit meter 508. The wagering game machine 560 updates the credit meter 508 to show the credit balance, and then permits game play to continue.
- Strict Mode for Combined Primary and Secondary Game Totals for a Secondary Game that Extends Beyond the Game Play Session. This embodiment is similar to the one previously described. However, in this scenario, the secondary game is an extended game that doesn't produce an immediate game result. In other words, the secondary game server purposefully takes a long time to provide a game result because of the nature of the secondary game. An example of such a secondary game is a "Fish Tank" type of game where a player places a wager on an animated fish lasting the longest time in a tank while not being eaten or caught. Such a game does not provide a result in an acceptable amount of time that warrants suspending game play on the main window 502, or any other side-window, until the secondary server 580 provides a game result. As a result, the wagering game machine 560 detects that the secondary game is an extended game, and consequently permits the primary game to play while the secondary game waits for a result. Further, the secondary game result may last so long that the player may end his or her game play session (e.g., cash out of the wagering game machine). As a result, when the player is ending his or her game play session, the wagering game machine 560 can communicates the final account balance to the account server 570. While the player is logged out of the system, the secondary server 580 may calculate a game result. If the game result is a "win", the secondary server 580 can communicate the win amount to the account server 570. The account server 570 can then update the account balance with the win amount. The system 500 can provide a notification, such as via a cell-phone text message, an email, or some other form of electronic message, which can notify the player of the win amount. The system 500 can also update a player account balance shown on a social network account, or other type of account available to view when the player is not inside the casino network. The social network account can display the account balance when the player logs on.
- Strict Mode for Exclusive Primary and Secondary Game Totals. In this embodiment, the wagering game machine 560 does not combine the totals of wagers for primary and secondary games. Instead, the secondary content (e.g., a Flash Application), in combination with the secondary server 580, determines its wager amounts and game result amounts, then calculates the final game result amount to the wagering game machine 560 to communicate to the account server 570 and/or to update the credit meter 508 displayed on the main window 502. The secondary content can also intermittently provide information to a primary game if the primary game needs to make a wager, but doesn't know whether the account balance is sufficient to place the wager. The secondary content, for example, can communicate with the account server 570 and determine if, based on the wager amount for the secondary game, the account balance can support a wager being placed by the primary game. If so, then the secondary content can either authorize the primary game to place the wager or hold the primary game in stasis until the secondary game completes its game activity and reports the results to the wagering game machine 560.

Example Wagering Game Machine Architecture

Figure 6:
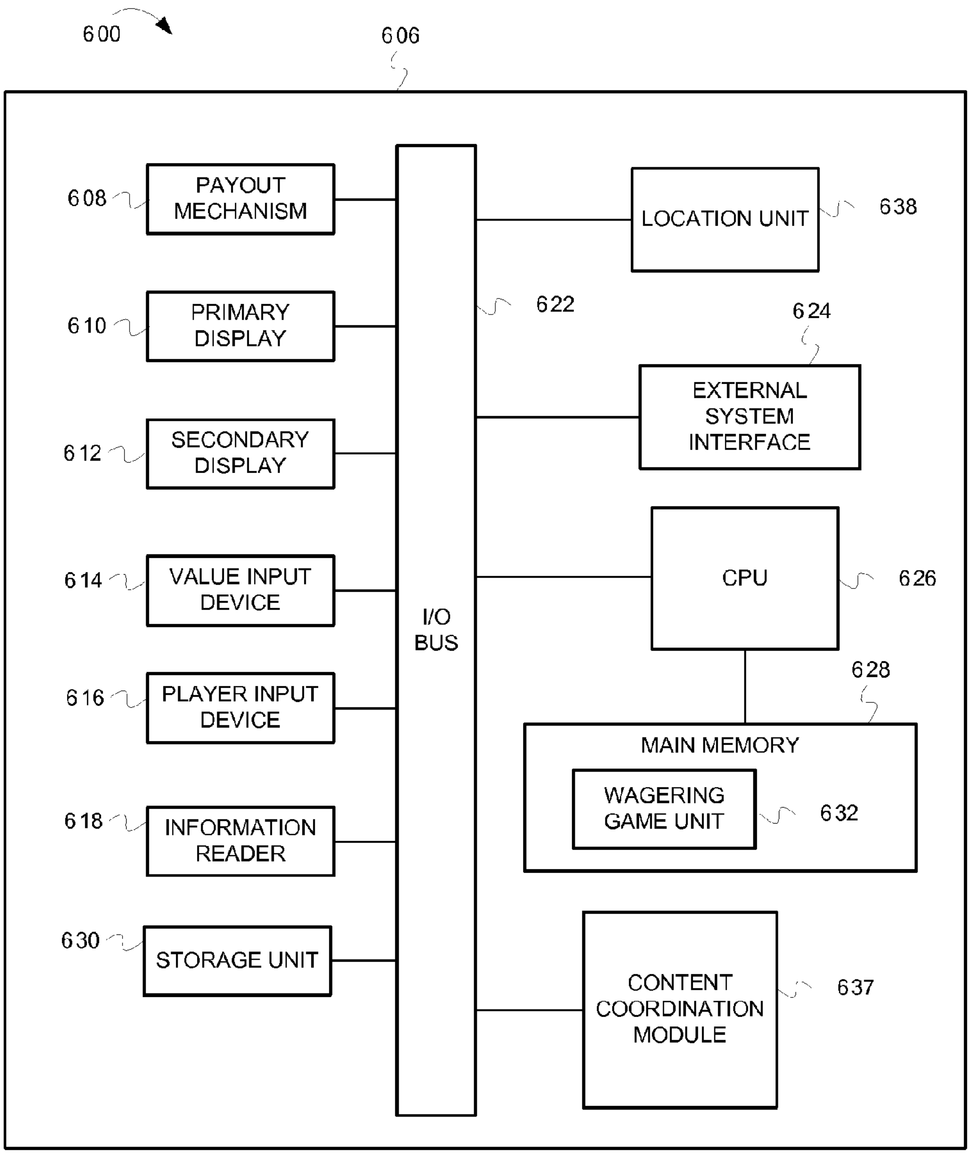
FIG. 6 is an illustration of a wagering game machine architecture 600, according to some embodiments.

FIG. 6 is a conceptual diagram that illustrates an example of a wagering game machine architecture 600, according to some embodiments. In FIG. 6, the wagering game machine architecture 600 includes a wagering game machine 606, which includes a central processing unit (CPU) 626 connected to main memory 628. The CPU 626 can include any suitable processor, such as an Intel® Pentium processor, Intel® Core 2 Duo processor, AMD Opteron™ processor, or UltraSPARC processor. The main memory 628 includes a wagering game unit 632. In one embodiment, the wagering game unit 632 can present wagering games, such as video poker, video black jack, video slots, video lottery, reel slots, etc., in whole or part.

The CPU 626 is also connected to an input/output ("I/O") bus 622, which can include any suitable bus technologies, such as an AGTL+frontside bus and a PCI backside bus. The I/O bus 622 is connected to a payout mechanism 608, primary display 610, secondary display 612, value input device 614, player input device 616, information reader 618, and storage unit 630. The player input device 616 can include the value input device 614 to the extent the player input device 616 is used to place wagers. The I/O bus 622 is also connected to an external system interface 624, which is connected to external systems 604 (e.g., wagering game networks). The external system interface 624 can include logic for exchanging information over wired and wireless networks (e.g., 802.11g transceiver, Bluetooth transceiver, Ethernet transceiver, etc.)

The I/O bus 622 is also connected to a location unit 638. The location unit 638 can create player information that indicates the wagering game machine's location/movements in a casino. In some embodiments, the location unit 638 includes a global positioning system (GPS) receiver that can determine the wagering game machine's location using GPS satellites. In other embodiments, the location unit 638 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 6, in some embodiments, the location unit 638 is not connected to the I/O bus 622.

In one embodiment, the wagering game machine 606 can include additional peripheral devices and/or more than one of each component shown in FIG. 6. For example, in one embodiment, the wagering game machine 606 can include multiple external system interfaces 624 and/or multiple CPUs 626. In one embodiment, any of the components can be integrated or subdivided.

In one embodiment, the wagering game machine 606 includes a content coordination module 637. The content coordination module 637 can process communications, commands, or other information, where the processing can present wagering game content in multiple windows, and where the wagering game content comes from a plurality of different content providers.

Any component of the wagering game machine 606 can include hardware, firmware, and/or machine-readable media including instructions for performing the operations described herein. Furthermore, the wagering game machine 606 can include any of the components described above, such as those described in reference to the wagering game machine 260 of FIG. 2 (or other any of the figures).

Example Mobile Wagering Game Machine

Figure 7:
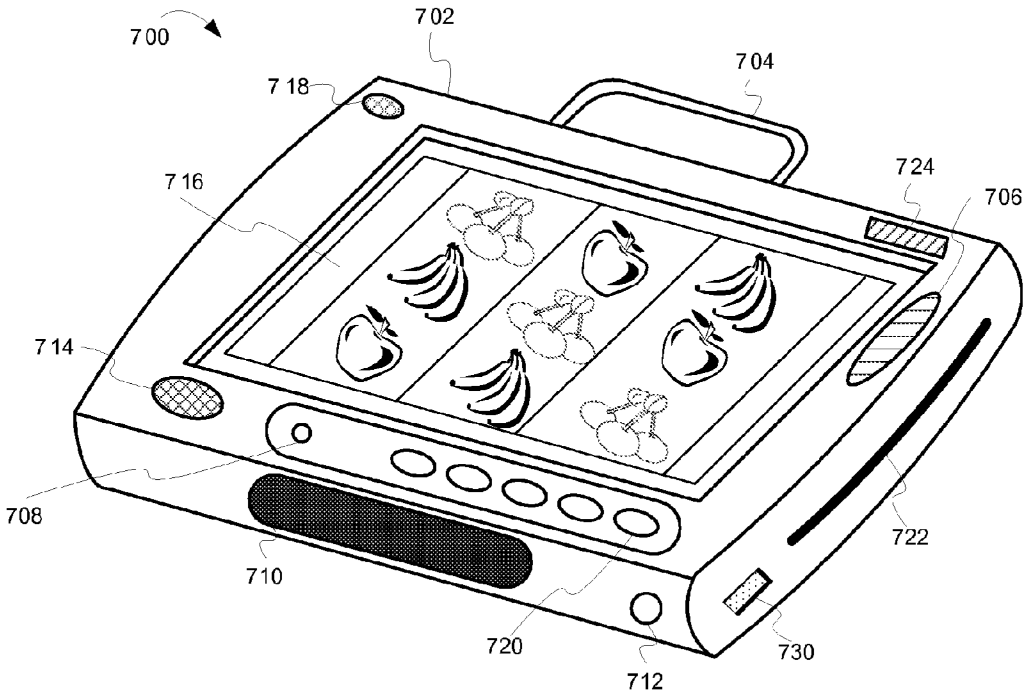
FIG. 7 is an illustration of a mobile wagering game machine 700, according to some embodiments.

FIG. 7 is a conceptual diagram that illustrates an example of a mobile wagering game machine 700, according to some embodiments. In FIG. 7, the mobile wagering game machine 700 includes a housing 702 for containing internal hardware and/or software such as that described above vis-à-vis FIG. 6. In one embodiment, the housing has a form factor similar to a tablet PC, while other embodiments have different form factors. For example, the mobile wagering game machine 700 can exhibit smaller form factors, similar to those associated with personal digital assistants. In one embodiment, a handle 704 is attached to the housing 702. Additionally, the housing can store a foldout stand 710, which can hold the mobile wagering game machine 700 upright or semi-upright on a table or other flat surface.

The mobile wagering game machine 700 includes several input/output devices. In particular, the mobile wagering game machine 700 includes buttons 720, audio jack 708, speaker 714, display 716, biometric device 706, wireless transmission devices 712 and 724, microphone 718, and card reader 722. Additionally, the mobile wagering game machine can include tilt, orientation, ambient light, or other environmental sensors.

In one embodiment, the mobile wagering game machine 700 uses the biometric device 706 for authenticating players, whereas it uses the display 716 and speakers 714 for presenting wagering game results and other information (e.g., credits, progressive jackpots, etc.). The mobile wagering game machine 700 can also present audio through the audio jack 708 or through a wireless link such as Bluetooth.

In one embodiment, the wireless communication unit 712 can include infrared wireless communications technology for receiving wagering game content while docked in a wager gaming station. The wireless communication unit 724 can include an 802.11G transceiver for connecting to and exchanging information with wireless access points. The wireless communication unit 724 can include a Bluetooth transceiver for exchanging information with other Bluetooth enabled devices.

In one embodiment, the mobile wagering game machine 700 is constructed from damage resistant materials, such as polymer plastics. Portions of the mobile wagering game machine 700 can be constructed from non-porous plastics which exhibit antimicrobial qualities. Also, the mobile wagering game machine 700 can be liquid resistant for easy cleaning and sanitization.

In some embodiments, the mobile wagering game machine 700 can also include an input/output ("I/O") port 730 for connecting directly to another device, such as to a peripheral device, a secondary mobile machine, etc. Furthermore, any component of the mobile wagering game machine 700 can include hardware, firmware, and/or machine-readable media including instructions for performing the operations described herein.

The described embodiments may be provided as a computer program product, or software, that may include a machine-readable medium having stored thereon instructions, which may be used to program a computer system (or other electronic device(s)) to perform a process according to embodiments(s), whether presently described or not, because every conceivable variation is not enumerated herein. A machine readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method comprising:

receiving, from a first content source, a first wagering game content for a first wagering game;

receiving, from a second content source, a second wagering game content for a second wagering game , wherein the first wagering game and the second wagering game are a same type of wagering game;

presenting, on a display of a wagering game machine, the first wagering game content in a first window;

presenting the second wagering game content in a second window on the display, wherein the first wagering game content occupies the first window during at least a duration of time that the second wagering game content occupies the second window;

determining a priority value that indicates a relative importance of the first wagering game content over the second wagering game content; and preventing, based on the priority value, certain actions of the first window, wherein the certain actions are not disabled for different priority values.

2. The method of claim 1, wherein the first content source is a first wagering game store of a first wagering game manufacturer and the second content source is a second wagering game store of a second wagering game manufacturer different from the first wagering game manufacturer.

3. The method of claim 1, wherein the same type of wagering game requires a wager for each play of the wagering game and further comprising:

receiving wagers for each of the first wagering game and the second wagering game;

detecting user input that selects a single control that activates play on both the first wagering game and the second wagering game; and processing the wagers for each of the first wagering game and the second wagering game in response to the user input.

4. The method of claim 1, wherein the determining the priority value comprises:

detecting a first wagering game outcome for the first wagering game content; and determining that presentation of the first wagering game outcome for the first wagering game is not complete.

5. The method of claim 1, further comprising:

detecting that the first wagering game content includes a first winning outcome for a first wager;

detecting that the second wagering game content includes a second winning outcome for a second wager;

determining that a first award value for the first winning outcome is greater than a second award value for the second winning outcome; and presenting a first congratulatory message for the first wagering game before presenting a second congratulatory message for the second wagering game based on the first award value being greater than the second reward value.

6. One or more non-transitory machine-readable media having instructions stored thereon, which when executed by a set of one or more processors causes the set of one or more processors to perform operations comprising:

receiving a first control statement to present a first wagering game content in a first window on a display of a wagering game machine, wherein the first wagering game content originates from a first wagering game manufacturer;

receiving a second control statement to present a second wagering game content in a second window on the same display of the wagering game machine, wherein the second wagering game content originates from a second wagering game manufacturer, and wherein the first wagering game and the second wagering game are of a type of wagering game;

determining a priority for the first control statement and the second control statement based on a set of priority rules, wherein the priority indicates that the first wagering game content associated with the first control statement is more important than the second wagering game content associated with the second control statement;

processing the first control statement and the second control statement in order of the priority; and preventing certain actions of the second window based on the priority;

presenting, in order of the priority, the first wagering game content and the second wagering game content, wherein the first wagering game content appears in the first window with greater significance than the second wagering game content in the second window.

7. The machine-readable media of claim 6, wherein said operation for determining a priority includes determining that the first control statement is more important than the second control statement based on a value for a first wager for the first wagering game compared to another value for a second wager for the second wagering game.

8. The machine-readable media of claim 6, wherein the operation of determining a priority for the first control statement and the second control statement based on a set of priority rules comprises:

generating a third control statement to change the size of the first window to cover a portion of the second window with the first window.

9. The machine-readable media of claim 6, said operations further comprising:

receiving a wagering game player request;

determining a respective priority of the wagering game player request in relation to any one or more of the first control statement and the second control statement; and processing the wagering game player request according to the respective priority.

10. The machine-readable media of claim 6, wherein the operation for processing the first control statement and the second control statement according to the priority comprises deactivating one or more wagering game player request controls while processing any one or more of the first wagering game content and the second wagering game content.

11. A system, comprising:
a first wagering game server configured to provide first wagering game content for a first wagering game;
a second wagering game server configured to provide second wagering game content for a second wagering game, wherein the first wagering game and the second wagering game are a same type of wagering game; and
a wagering game machine configured to
receive one or more user inputs that indicate a placement of a first wager for the first wagering game and a placement of a second wager for the second wagering game, wherein the placement of the first wager and the placement of the second wager overlap in time,
receive the first wagering game content in response to the first wager and receive the second wagering game content in response to the second wager,
determine a priority that indicates a relative importance of the second wagering game content over the first wagering game content,
present the first wagering game content in a first window on a display of the wagering game machine, and
present the second wagering game content in a second window on the same display of the wagering game machine with greater prominence than the first wagering game content in the first window based on the priority; and
prevent certain actions of the second window based on the priority.

12. The system of claim 11, wherein the first wagering game server is configured to serve wagering games created by a first wagering game manufacturer and the second wagering game server is configured to serve wagering games created by a second wagering game manufacturer.

13. The system of claim 11, wherein any one or more of the first window and the second window includes one or more wagering controls for a wagering game player to interact with, wherein the one or more wagering controls are configured to simultaneously control a similar wagering function for both the first wagering game and the second wagering game.

14. The system of claim 11, further comprising:
a coordination unit configured to
determine from the first control instructions and the second control instructions respective priorities for the first wagering game content and the second wagering game content, and
control any one or more of the first window and the second window according to the respective priorities of the first wagering game content and the second wagering game content.

15. The system of claim 14, wherein the first window is configured to present a first wagering game and the second window comprise a first auxiliary window configured to present a second wagering game and a second auxiliary window configured to present a third wagering game, and wherein the coordination unit is configured to
determine from the first control instructions and the second control instructions that the second wagering game has a higher priority than both the first wagering game and the third wagering game, and
raise the first auxiliary window above both the second auxiliary window and the first window.

16. The system of claim 11, wherein the wagering game machine comprises any one or more of meters and controls to control wagering activity for both the first wagering game content and the second wagering game content.

17. An apparatus, comprising:
a first content controller configured to provide control information for a first wagering game content;
a second content controller configured to provide control information for a second wagering game content;
a windows controller configured to control the presentation of the first wagering game content and the second wagering game content on a plurality of content windows on a display of a wagering game machine; and
a coordination unit configured to coordinate the presentation of the first wagering game content and the second wagering game content in the plurality of content windows according to a priority indicating a relative importance of the first wagering game content compared to the second wagering game content, and wherein the first window and the second window include playing controls for a wagering game player to interact with, wherein the playing controls are configured to control playing functions for the first wagering game and the second wagering game, and wherein at least one of the playing controls is disabled based on the priority.

18. The apparatus of claim 17, wherein the windows controller is configured to control any one or more of a position, a layering, a size, a movement, a reaction, a control, a special effect, and a characteristic of the plurality of content windows.

19. The apparatus of claim 17, wherein the coordination unit is configured to reconcile conflicting priority control statements from any one or more of the first content controller and the second content controller.

20. The apparatus of claim 17, wherein windows controller is configured to present the second wagering game content with greater significance than the first wagering game content when the second wagering game content is presenting a high priority event.

* * * * *